United States Patent [19]
Jung

[11] Patent Number: 6,152,003
[45] Date of Patent: *Nov. 28, 2000

[54] CUTTING DEVICE WITH ELEVATION REGULATION

[75] Inventor: Rolf Jung, Münsingen, Germany

[73] Assignee: Bullmer Spezialmaschinen GmbH, Musingen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/965,374

[22] Filed: Nov. 6, 1997

[30] Foreign Application Priority Data

Nov. 7, 1996 [DE] Germany ............... 196 45 986
Apr. 30, 1997 [DE] Germany ............... 197 18 436
May 6, 1997 [DE] Germany ............... 197 19 182

[51] Int. Cl.⁷ ..................................................... B26D 5/00
[52] U.S. Cl. ................................. 83/74; 83/881; 83/940
[58] Field of Search .............................. 83/881, 879, 368, 83/940, 100, 435.2, 155, 649, 883, 74

[56] References Cited

U.S. PATENT DOCUMENTS

| | | | |
|---|---|---|---|
| 3,680,101 | 7/1972 | Granqvist | 343/14 |
| 3,735,660 | 5/1973 | Pearl | 83/940 |
| 3,743,419 | 7/1973 | Skagerlund | 356/5 |
| 3,848,490 | 11/1974 | Arel | 83/368 |
| 4,060,016 | 11/1977 | Gerber | 83/940 |
| 4,338,032 | 7/1982 | Bardsley et al. | 356/431 |
| 4,345,496 | 8/1982 | Pearl | 83/100 |
| 4,375,175 | 3/1983 | Elsas et al. | 83/368 |
| 4,401,001 | 8/1983 | Gerber et al. | 83/881 |
| 4,419,913 | 12/1983 | Schutt et al. | 83/940 |
| 4,438,754 | 3/1984 | Nanny et al. | 83/368 |
| 4,728,385 | 3/1988 | Hell | 156/353 |
| 4,920,495 | 4/1990 | Pilkington | 83/881 |
| 4,951,539 | 8/1990 | Buckner | 83/883 |
| 5,062,332 | 11/1991 | Blaimschein et al. | 83/74 |
| 5,080,297 | 1/1992 | Blaimschein | 242/56.8 |
| 5,224,406 | 7/1993 | Nasu | 83/940 |
| 5,261,305 | 11/1993 | Nasu | 83/435.2 |
| 5,515,758 | 5/1996 | Bechmann | 83/881 |
| 5,538,056 | 7/1996 | Thoma | 83/881 |
| 5,767,953 | 6/1998 | McEwan | 356/5.01 |

FOREIGN PATENT DOCUMENTS

| | | |
|---|---|---|
| 0351223 | 1/1990 | European Pat. Off. . |
| 0384914 A1 | 8/1990 | European Pat. Off. . |
| 0419754 | 4/1991 | European Pat. Off. . |
| 0445494 A1 | 9/1991 | European Pat. Off. . |
| 0199396 | 9/1987 | Japan ............... 83/940 |
| 0026775 | 1/1989 | Japan ............... 83/940 |
| 431796 | 9/1967 | Switzerland . |
| 2057956 | 4/1981 | United Kingdom . |
| 2087290 | 5/1982 | United Kingdom . |
| 2175828 | 12/1986 | United Kingdom . |

*Primary Examiner*—Kenneth E. Peterson
*Assistant Examiner*—Stephen Choi
*Attorney, Agent, or Firm*—Fitzpatrick, Cella, Harper, Scinto

[57] ABSTRACT

There is described a cutting device for fabric and similar material which comprises a cutting table on the surface of which a material support is mounted; a cutting tool which is moveable over the table to penetrate and cut material lying on the support; and a control arrangement which measures the distance to the table surface under the support and thereby controls the depth of cutting tool penetration so that it extends a predetermined distance into the support, independently of applied pressure on the cutting tool.

17 Claims, 5 Drawing Sheets

CUTTING DEVICE WITH ELEVATION REGULATION

BACKGROUND OF THE INVENTION

1. Field of the Invention

The invention relates to a cutting device for cutting limply flexible material, such as e.g. fabric layers, leather skins or the like.

2. Description of the Related Art

A cutting device of the kind concerned includes a cutting table, the table surface of which carries a cutting support on which the material can be spread out. Further, a cutting head is provided, which cutting head is so arranged above the table surface that it is movable above the surface. A cutting tool, provided at the cutting head, is brought into engagement with the material to be cut by lowering down, in order to cut the material in correspondence to a given pattern. Thereby, the cutting tool completely penetrates through the material to be cut and penetrates into the cutting support.

In conventional devices of this kind there is used as cutting support a material which is suitable, through the pressure of the cutting tool, frequently a cutting wheel, on the cutting support, to cut through the material to be cut lying thereupon. Thereby, the cutting tool can penetrate more or less into the cutting support, for example also to cut the cutting support and/or to elastically deform it. The cutting support usually lies on a table, whereby very frequently the cutting support and the material to be cut lying thereupon are held against the table by vacuum suction. Significant with such devices is that, on the one hand, the cutting tool always penetrates through the material to be cut but does not penetrate through the cutting support itself as far as the means on which it is carried, since with too strong a penetration into the cutting support the cutting tool could break or be destroyed on the table. Conventionally, the pressure exercised by the cutting tool on the material to be cut or on the cutting support is detected and from this the cutting head carrying the cutting tool is adjusted in its height. It is however necessary, in dependence upon the material to be cut in each case and the thickness of the material to be cut in each case, to specially set the pressure which, for the follow-up device employed, is to be regarded as desired pressure. Further, it has also to be taken into account that different tools, because of their different configurations, also give rise to different cutting resistances, for which reason the corresponding desired pressure must in each case be newly set in dependence thereupon. The pressure setting is, however, rather time consuming and complex. With materials the stiffness of which and the thickness of which vary, for example leather, an appropriate setting of the desired pressure is only possible to a limited extent. Thus, with the devices according to the state of the art, it cannot be ensured that the material to be cut is always reliably separated, the cutting tool, however, not penetrating too deeply into the cutting support.

The penetration depth of the cutting heads of known cutting devices can be so set in dependence upon the material to be cut, e.g. by means of a variable weight loading or a variable spring biasing, that the cutting tool penetrates into the material carrier with a certain penetration depth.

With a penetration depth which is too small there is the danger that the material to be cut will not be completely separated or will not be cleanly cut.

When, on the other hand, the cutting tool penetrates too deeply into the cutting support, there is the disadvantage of premature wear of the cutting support as a result of the deep cutting grooves which are formed. Further, in the case of a too deep entry of the cutting tool into the cutting support, there is the danger of blade breakage which in practice frequently occurs in particular when cutting tight radiuses. The time then required for changing the cutting tool significantly increases production costs.

A further disadvantage consists in that with constantly changing different materials to be cut, the structures and material thicknesses of which and thus the cutting resistances of which vary significantly, the application pressure of the cutting tool must be newly set with each change of material, in order to achieve a constant penetration depth. In practice this is not possible without unacceptable expenditure of effort. A further problem which also applies is that the cutting pressure and thus the penetration depth into the cutting support additionally change in dependence upon the sharpness of the cutter.

With the employment of a cutting head having a plurality of cutting tools there is further the problem that the different cutting tools, because of their different configurations, experience different resistances upon penetration of the material to be cut, which makes necessary a different setting of the application pressure for the different tools.

SUMMARY OF THE INVENTION

It is the object of the invention to so further develop a device according to the state of the art that a more reliable operation is possible.

The invention is based upon the insight that the cutting device can advantageously be provided with a sensor arrangement, in order to measure the distance between the cutting head and the table surface, preferably in a contactless manner. On the basis of this measured distance, a control arrangement can so regulate the penetration depth of the cutting tool into the material to be cut that with a full penetration stroke movement of the cutting tool this penetrates into the cutting support with a predetermined, constant amount, independently of the application pressure thereby exercised. Thus, it is significant that the height of the cutting head, and with this of the cutting tool, relative to the rest on which the cutting support lies, is constantly and continuously detected. By these means, the penetration depth of the cutting tool into the cutting support can be set to tenth-of-millimeter accuracy, whereby on the one hand the cutting support is conserved and on the other hand the material to be cut is always and reliably separated. By means of the exactly settable penetration depth it can also be ensured that the cutting tool, in particular a cutting blade, cannot break even with relatively small radiuses. By these means, the life of the cutting tool, and also of the cutting support, is strongly increased. Further, a new setting upon a change of the tool is not necessary; rather the cutting head can carry a plurality of tools in the manner of a revolving system, which tools are also suitable for the cutting of markings or for the cutting of holes, or for carrying out other measures necessary with the material to be cut in each case. The features relating to the configuration of the cutting support as a conveyable belt allow preparatory or finishing operations (laying out of the material to be cut before the table, or removal of cut material after the table) to be effected whilst cutting takes place on the table, and/or rapid exchange of worn out cutting supports, without significant interruption of operation.

According to a more specific aspect, there is arranged on the table surface, beneath the cutting support, a reflection layer of a material which reflects electromagnetic radiation, in particular of metal, whereby the sensor arrangement detects the distance on the basis of the electromagnetic radiation reflected from the reflection layer. As suitable electromagnetic radiation microwave radiation is in particular to be considered.

According to a further aspect the cutting table may include a vacuum chamber and openings may be provided in the table surface, in order to attract the material to be cut by suction. In this manner there is provided a uniform, slippage-free application of the material to be cut on the table surface. Further, the cutting support may be of a porous, air-permeable material, so that the vacuum is not broken by the cutting support. In corresponding manner, the reflection layer may have corresponding openings, and may in particular be formed as a perforated sheet, so that the partial vacuum exerted from the vacuum chamber is likewise not broken by the reflection layer.

According to another aspect there is there may be provided at the cutting head a plurality of cutting tools, which makes possible a rapid exchange of the cutting tools. Also, the entry depth of the cutting tool can be adjustable, in order to be able to set the optimal penetration depth. During the operation of the cutting device, the penetration depth is then continuously regulated by the sensor arrangement and control arrangement in accordance with the invention to the optimum amount, which is set once.

The cutting support is made preferably, of a tough plastics material. Also, the cutting support may simultaneously serve as a conveyor belt for delivery and conveying away of the material to be cut. Advantages of further configurations are explained below.

BRIEF DESCRIPTION OF THE DRAWINGS

Below, the invention will be described with reference to preferred exemplary embodiments and with reference to the drawings. In the drawings there are shown.

DETAILED DESCRIPTION OF THE PREFERRED EMBODIMENTS

Figure 1:
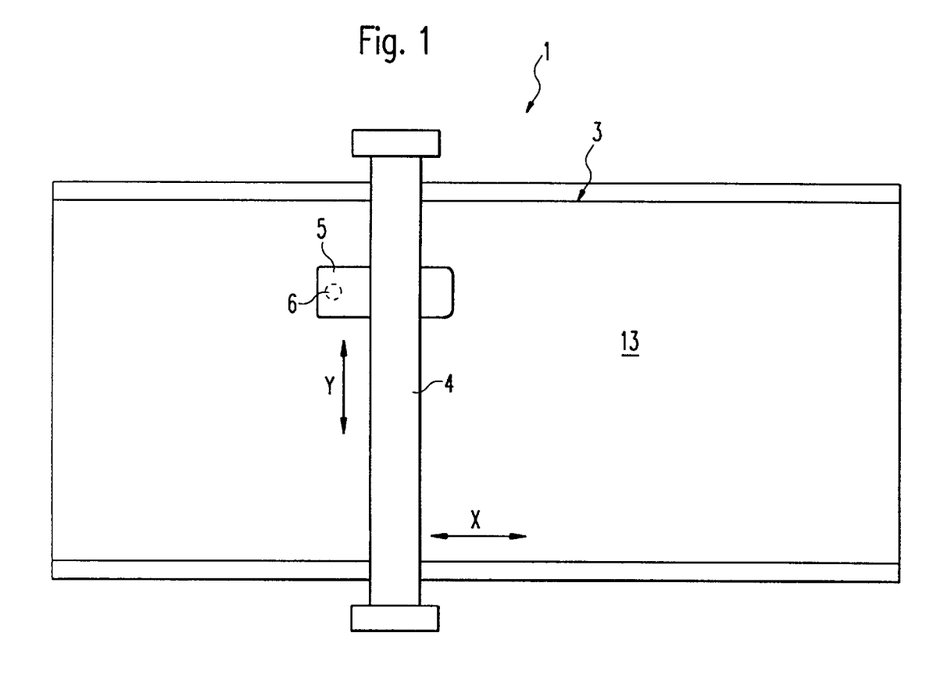
FIG. 1 a plan view of a cutting device in accordance with the invention, in a schematic illustration.

FIG. 1 shows a view on to a cutting device 1 in relation to which the development according to the invention is applied. The cutting device consists of a cutting table 3, the table surface of which carries a cutting support 13. The cutting support 13 is preferably of a tough plastics material, such as e.g. polyvinylchloride (PVC), polyvinylidenechloride, polyethylene and/or polypropylene and may be arranged either to be stationary or to serve simultaneously as movable conveyor belt for the delivery and conveying away of the material can be cut. A cutting head 5 is attached, movable in y direction, to a cutting bridge 4, movable in x direction i.e. transversely across the table 3. A cutting tool 6, arranged on the cutting head 5 (merely schematically illustrated in FIG. 1); is in this way movable over the entire table surface 3.

Figure 2:
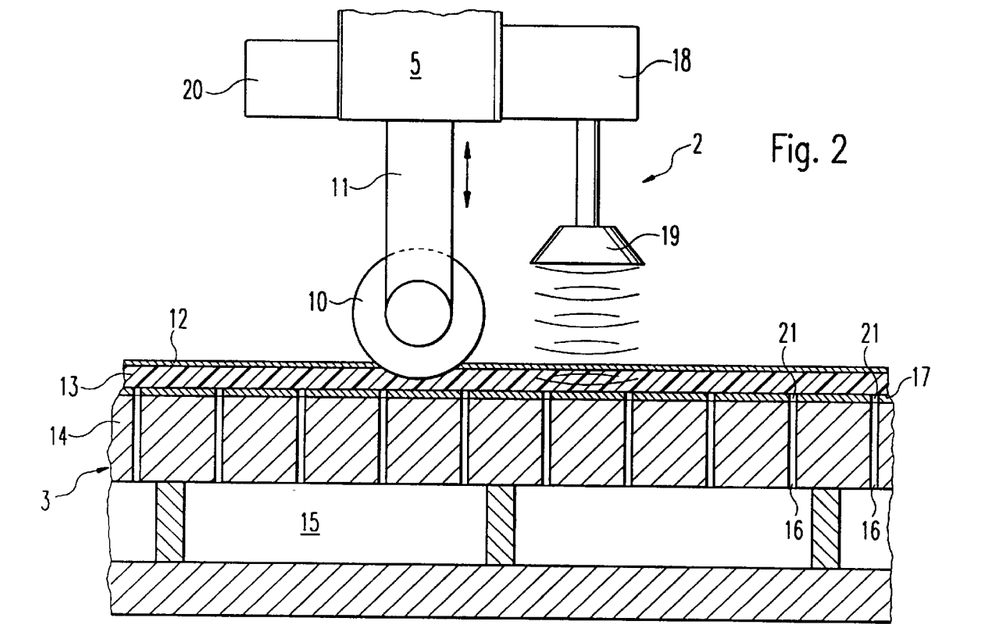
FIG. 2 a fragmentary side elevational view of a first exemplary embodiment of a cutting device in accordance with the invention, in a partially sectioned illustration.

FIG. 2 shows a first exemplary embodiment of the cutting device 1 in accordance with the invention, in a partially sectioned side illustration. There can be seen the cutting head 5, to which a cutting tool, constituted as cutting wheel 10, is attached via a connection element 11. The cutting wheel 10 is rotatably mounted at the connection element 11, preferably in a ball bearing. By means of action with an application pressure effective in horizontal direction, the cutting wheel 10 penetrates through the material to be cut 12 and penetrates by a predetermined amount into the cutting support 13. The cutting wheel 10 carries out a rolling movement during the cutting procedure, so that the material to be cut 12 is cut in accordance with a predetermined cutting pattern. The coordinate position of the cutting wheel 10 is continuously adjustable by means of movement of the cutting bridge 4 (FIG. 1) and of the cutting head 5 arranged on the cutting bridge 4, correspondingly to the cutting pattern to be cut. The connection element 11 can, thereby, be so rotated that the cutting wheel 10 is always tangentially directed with regard to the cutting line.

In order to fix the material 12 to be cut in its position relative to the table surface, and with this to ensure an even bearing of the material on the cutting table 3, and to avoid slippage of the material during the cutting procedure, the cutting table 3 has a vacuum chamber 15 which is connected with a vacuum source (not shown) in a manner known per se. In the table surface 14 there are provided openings 16, e.g. formed as bores, to which there connect openings 21 which extend through a reflection layer 17 (described more fully hereinbelow), which lies beneath the cutting support 13. The reflection layer 17 may be formed in particular as a perforated sheet. The cutting support 13 is preferably of a porous, air-permeable material, so that the underside of the material to be cut 12 is acted upon with the vacuum in the intended manner.

The optimum penetration depth of the cutting tool, formed as a cutting wheel 10 in the exemplary embodiment of FIG. 2, is determined on the one hand in that the material to be cut 12 is completely and reliably separated and on the other hand in that an unnecessarily deep groove formation in the cutting support 13 is avoided.

The optimum penetration depth of the cutting tool 10 can be set via an adjustment device (not shown). In accordance with the development according to the invention, measures are provided in order to regulate the adjusted optimum penetration depth of the cutting tool 10 to the optimum constant amount during the entire cutting procedure. For this purpose, the cutting head 5 has a sensor 2, having in the exemplary embodiment, a transmission and reception device 18. The transmission and reception device 18, in the exemplary embodiment, emits electromagnetic radiation in the direction towards the reflection layer 17, which is preferably made of metal, and receives the electromagnetic radiation reflected from the reflection layer 17. The electromagnetic radiation is preferably microwave radiation, which is suitable, e.g. in a wavelength range of a few centimeters or decimeters. The microwave radiation can be emitted by means of the transmission and reception antenna 19 in the direction towards the reflection layer 17. By means of evaluation of the radiation reflected from the reflection layer there can be determined in a manner known per se the distance between the transmission and reception antenna 19 and the reflection layer 17. From this measured distance, the penetration depth of the lower edge of the cutting wheel 10 into the cutting support 13 can be calculated.

If the actual penetration depth, determined in this manner, is greater than the predetermined or adjusted desired penetration depth, the cutting wheel 10 is then so far raised, by means of an elevator device schematically indicated by the double arrow, until the detected actual penetration depth coincides with the predetermined desired penetration depth. If, on the other hand, the detected actual penetration depth is less than the predetermined desired penetration depth, the cutting wheel 10 is then lowered so far by means of the elevator device until the detected actual penetration depth coincides with the predetermined desired penetration depth. For the above-described control procedure, a corresponding control arrangement 20 is provided in the cutting head 5.

Figure 3:
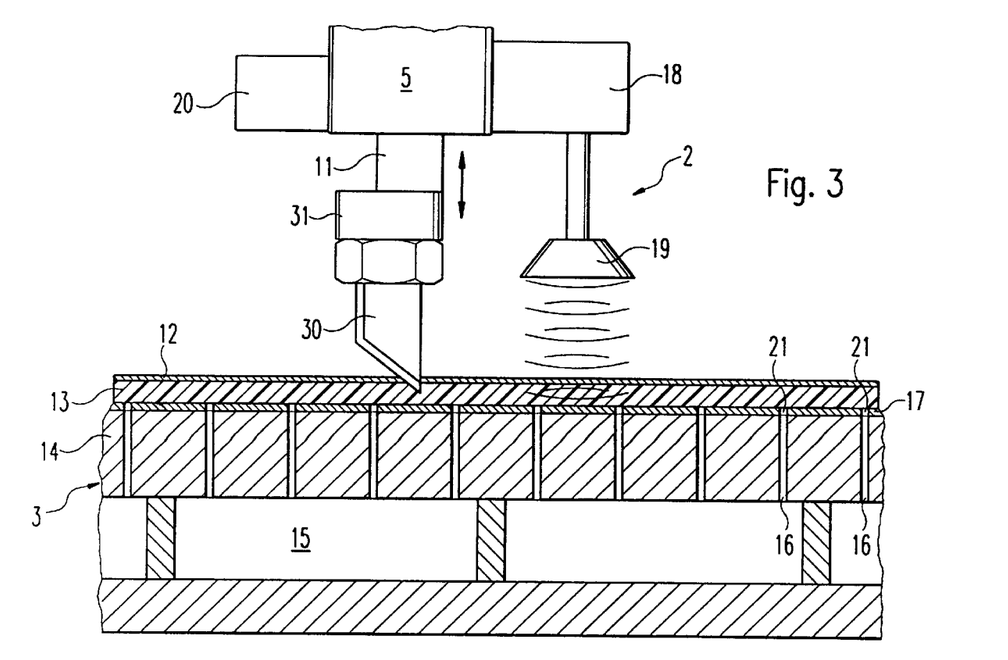
FIG. 3 a side view of a second exemplary embodiment of the cutting device of FIG. 1 in accordance with the invention, in a partially sectioned illustration.

FIG. 3 shows a second exemplary embodiment of the cutting device in accordance with the invention, in a partially sectioned side illustration. The components already described with reference to FIG. 2 are provided with the same reference characters, so that a repeat description with regard thereto is not necessary.

Instead of the cutting wheel 10 illustrated in FIG. 2, in the exemplary embodiment illustrated in FIG. 3, a draw knife 30 is provided. The draw knife 30 can, for improvement of the cutting effect, be set into vertical, high frequency, short oscillations, which preferably lie in the ultrasonic frequency range. The ultrasonic vibrations can be generated e.g. by means of an ultrasonic oscillator 31 arranged between the connection element 11 and the draw knife 30. The penetration depth regulated by the control arrangement 20 in accordance with the invention relates thereby to the maximum penetration depth at full penetration stroke movement of the draw knife 30 oscillating in the vertical direction.

The draw knife 30 is drawn by the cutting head 5, which is movable in x and y directions (across and lengthwise of the table 3), along the cutting line predetermined by the cutting pattern, whereby the draw knife 30 penetrates so far into the cutting support 13 that the separation of the material 12 to be cut is reliably ensured. The measurement of the distance of the transmission and reception antenna 19 from the reflecting layer 17, and the detection of the penetration depth of the lower end of the draw knife 30 into the cutting support 13 upon full penetration stroke movement of the draw knife 30 oscillating in vertical direction, which detection is based upon the measurement mentioned above, correspond completely to the procedure described with reference to FIG. 2.

With the further developed cutting device 1 in accordance with the invention it is possible to regulate the penetration depth of the cutting tool to a predetermined, constant amount.

In this manner, the depth of the grooves formed by the cutting tools in the cutting support 13 is restricted to the necessary amount, and a premature wear of the cutting support 13 prevented. Further, through the only slight penetration depth of the cutting tools into the cutting support 13, a breakage of the cutting tool is prevented, which is of particular importance with the draw knife 30 illustrated in FIG. 3. Also, the cutting of tight radiuses can be effected without the danger of a knife breakage. The regulation mechanism in accordance with the invention is, furthermore, independent of the constitution, in particular the thickness and the structure, of the material to be cut 12 and is further independent of the application pressure with which the cutting tool is applied.

The exemplary embodiments illustrated in FIGS. 2 and 3 can also be combined in that both a cutting wheel 10 and also a draw knife 30 are provided at one cutting head 5, whereby the cutting knife 7 can be employed for example for the cutting of markings or of holes, whilst the cutting wheel 7 is suitable for cutting the material to be cut in accordance with a cutting pattern.

Depending in each case upon the requirements of the cutting line to be cut, the tools can be automatically exchanged for one another. The regulation device in accordance with the invention thereby provides, for each cutting tool, for the respective optimum penetration depth. Further, there may alternatively or additionally be provided e.g. also a stamping tool with the cutting head 5. The so-called revolving system can be employed here.

When the cutting support 13 is formed as conveyor belt, this preferably has very fine holes, e.g. bored with a laser, so that the cutting support 13 is air permeable. Further, the conveyor belt must be enclosed air tight within the entire facility, in order to make the vacuum effective.

The vacuum chamber 15 can also be divided into individual sub-chambers, whereby in dependence upon the position of the cutting tool 10 or 30, the vacuum is only built up in those sub-chambers above which the cutting tool 10 or 30 is momentarily located.

Thus, the cutting head 5 carries a sensor 2 which serves for the purpose of detecting the distance of the cutting head 5 from the underside of the cutting support 13 or the upper side of the reflection layer 17, in a contactless manner. In the case of the employment of a perforated plate or a perforated sheet it is expedient to so determine the effective cross-section of the sensor 2 that it is larger than a hole in the perforated plate, so that the distance detection is possible independently of whether the sensor 2 is located above a hole of the perforated sheet or over a material part of the perforated sheet. In accordance with normal practice, the cutting head 5 is adjusted in height by means of an elevator or adjustment motor (not shown) . In dependence upon the output signal of the sensor 2, that is the actual height of the cutting head 5 above the perforated sheet, the adjustment motor can be so controlled that this actual height corresponds to a desired height, which in turn corresponds to the desired penetration depth of the cutting tool 10, 30 into the cutting support 13, in order to ensure that on the one hand the material to be cut 12 is cut through but on the other hand that the cutting tool 10, 30 does not penetrate unnecessarily deeply into the cutting support 13. Since, by means of commercially available sensors, which can be employed for this height detection, a detection in the tenth-of-a-millimeter range is possible, a corresponding setting of the height disposition of the cutting head 5 in relation to the cutting support 13 or the reflection layer 17 can also be ensured. The height adjustment by means of a follow-up device is effected independently of whether the material to be cut 12 is subject to variations in its thickness or in its material stiffness or whether the distance to the reflection layer changes for example also due to unevennesses, which are caused in the reflection layer 17 and its lying upon the table 14. The follow-up is also independent of whether the cutting support 13 is itself subject to variations in its thickness. By these means, the penetration depth can be set with tenth-of-a-millimeter accuracy, the cutting support 13 is conserved, the material to be cut 12 is reliably cut through and the cutting tool 10, 30 is no longer subject to breakage due to too deep penetration into the cutting support 13. By these means, the lifetime of the cutting tool 10, 30 and of the cutting support 13 is strongly increased. Further, separate setting with regard to different tools 10, 30, different materials to be cut 12, and different cutting supports 13, is no longer necessary.

Figure 4:
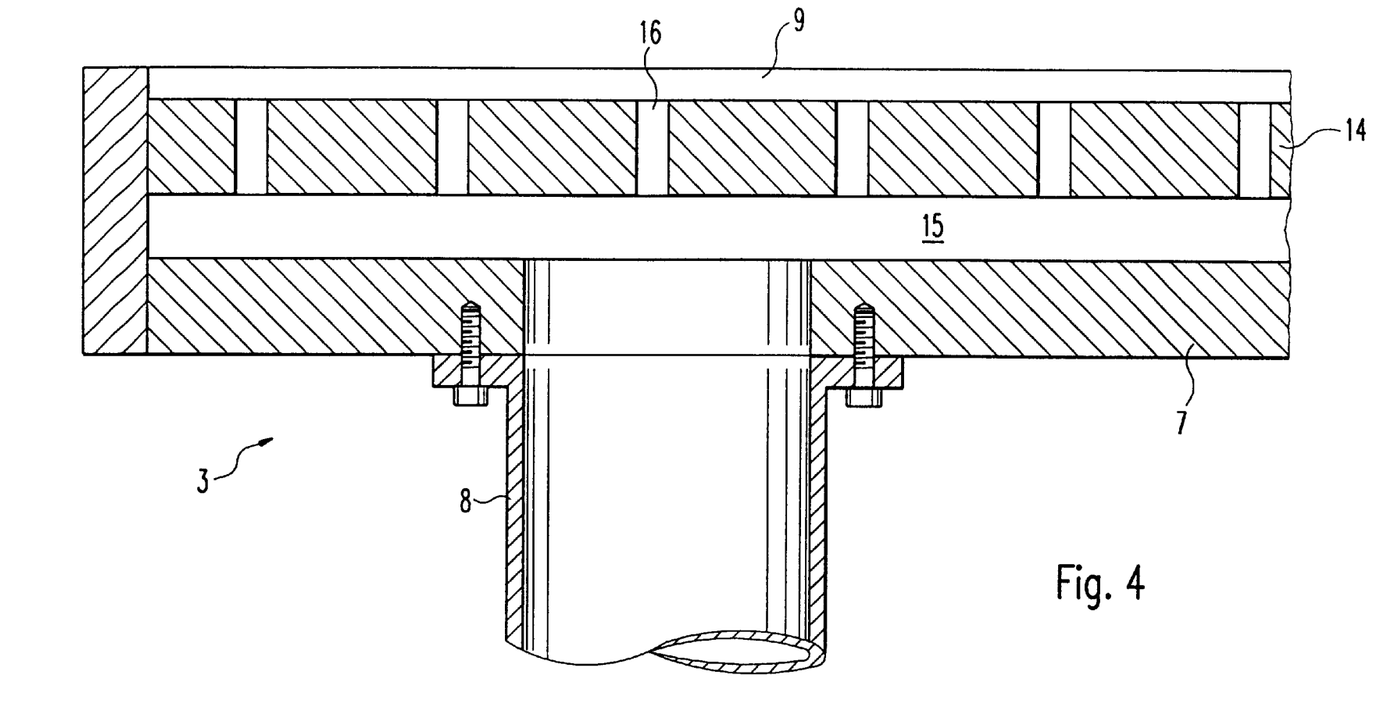
FIG. 4 a fragmentary section view through a table shown in FIG. 1.
Figure 5:
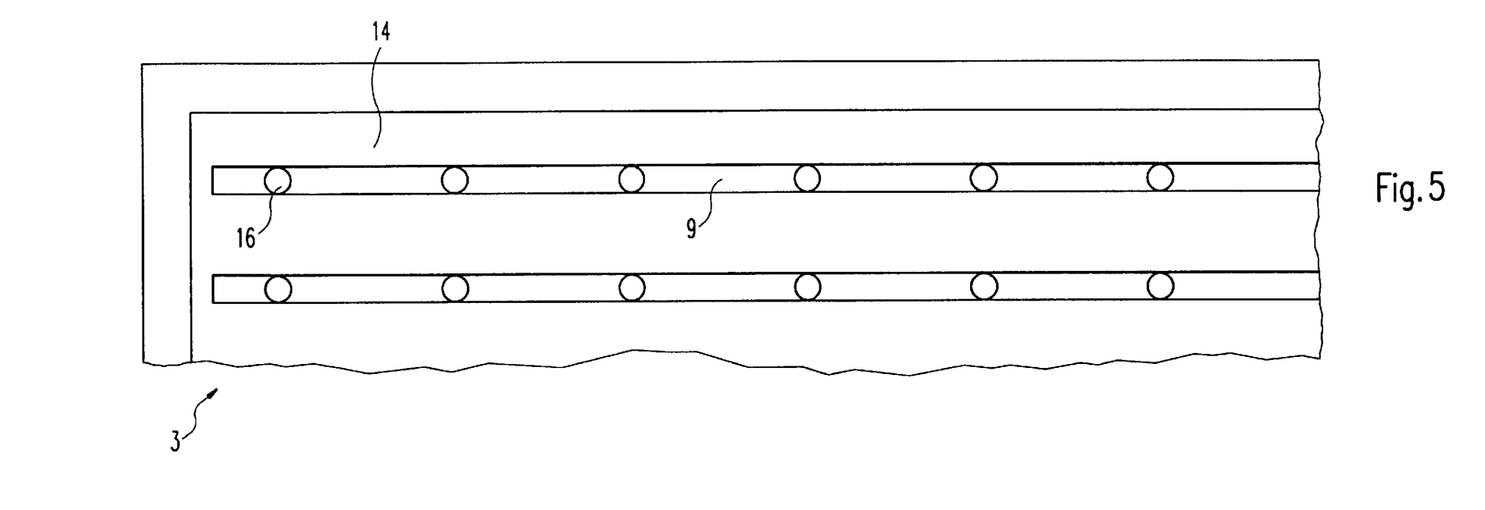
FIG. 5 a fragmentary plan view showing one configuration of the table of FIG. 4.
Figure 6:
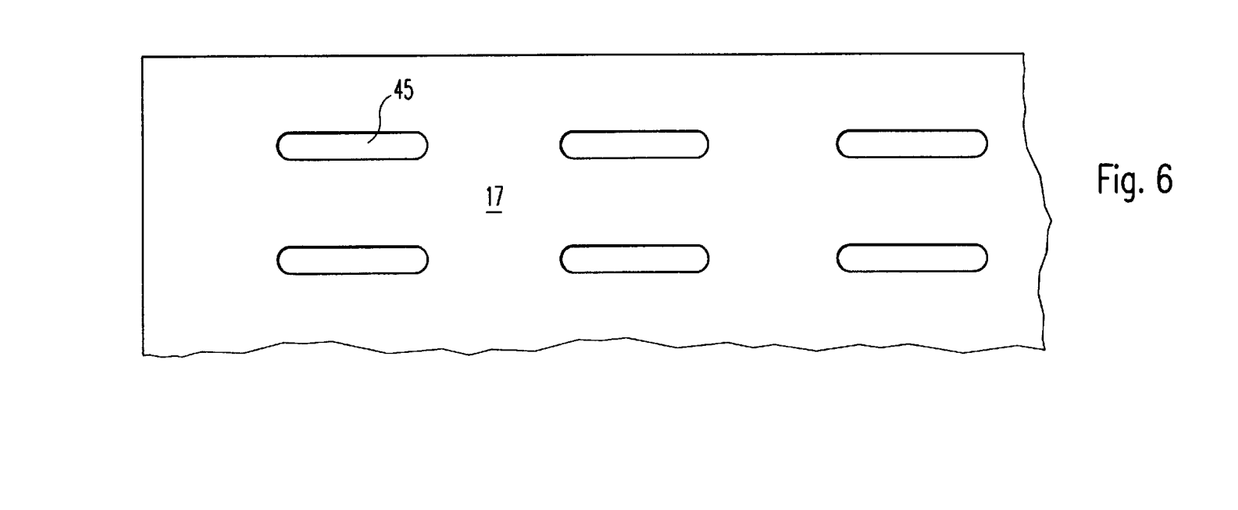
FIG. 6 a plan view showing the configuration of a perforated plate used on the table of FIG. 4.

The construction of the table will be described in more detail with reference to FIG. 4. The table 3 is formed as a box with an interior hollow chamber 15 and with a cover wall 14 which in the one hand has bores 16 and on the other hand has in its upper side milled grooves 9, on which wall in turn the perforated sheet bears as reflection layer 17. By way of connection pieces 8 in a floor wall 7 a connection can be effected to a vacuum pump (not shown), so that a partial vacuum is generated in the hollow chamber 15, whereby this partial vacuum can have effect on the cutting support 13 via the bores 16, the grooves 9 and the perforated sheet and, when the cutting support is permeable, on the material to be cut 12 so that a fixing of the material to be cut 12, or at least of the cutting support 13, on the table 3 is ensured. FIG. 5 shows that the bores 16 open out in the grooves 9 and that the grooves extend in longitudinal direction over the table 3. FIG. 6 shows a possible configuration of a perforated sheet as reflection layer 17, whereby the spacing of the various elongate holes 45 is adapted to the spacing of the grooves 9 and of the bores 16 in the table 3. However, there can also be employed another, more grid-like, plate element instead of the perforated sheet according to FIG. 6. It has proved that more than one layer of the material to be cut 12 can be cut in this way, when the material to be cut 12 is itself air permeable and is covered by an air non-permeable foil, as is per se known. However, conventional devices of the kind described above are typically employed for the cutting of single-layer material to be cut 12.

Figure 7:
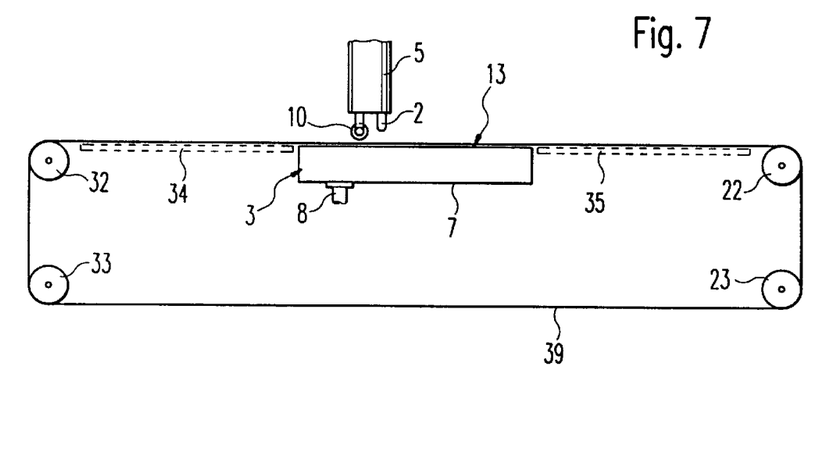
FIGS. 7 to 9 schematic illustrations, showing, in side elevation and perspective orientation, further configurations of developments of a cutting support which may be used with the cutting device of FIG. 1.
Figure 8:
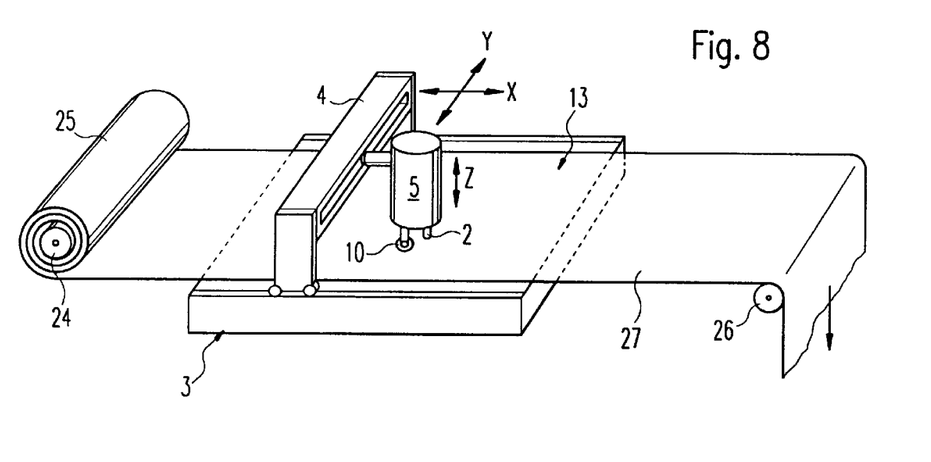
Figure 9:
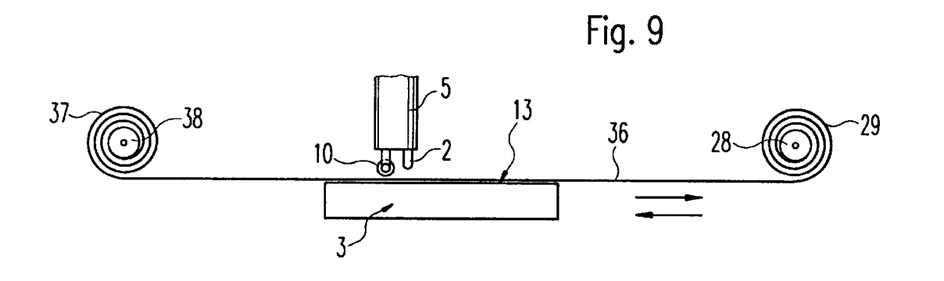

The further developments in accordance with FIGS. 7 to 9 are based upon the fundamental idea of constituting the cutting support 13 as a conveyable belt.

In accordance with FIG. 7, a circulating conveyor belt 39 is provided, which is guided over rollers 22, 23, 32 and 33, of which at least one is driven (not shown). In the section of the conveyor belt 39 which lies upon the table 3 the cutting support 13 is defined on which the material to be cut 12 (not shown) comes to bear and through suitable control of the cutting head 5 is cut. Expediently, between the rollers 32 and the table 3, the conveyor belt 39 is guided over a rigid surface element 34 and between the table 3 and the roller 22 is guided over a further rigid surface element 35. It is then possible, in the region of the rigid surface element 34 to lay out material to be cut (not shown) on the conveyor belt 39, whilst in the region of the table 3 cutting takes place. After completion of the cutting in the region of the table 3, the conveyor belt 39 is transported further in such a manner that the cut material arrives above the surface element 35 and material to be cut newly laid out in the region of the surface element 34 comes into the region of the table 3. Whilst, now, cutting again takes place in the region of the table 3, the already cut material can be cleared away in the region of the surface element 35.

By these means, not only is the cutting support 13 conserved, since the cutting or forming procedures are divided between a plurality of sections of the conveyor belt 39, but also the speed of working is increased, since the preparatory measures for a subsequent cutting and finishing measures for a completed cutting can be carried out at the same time as a cutting procedure.

In the exemplary embodiment according to FIG. 8, the conveyor belt is constituted as a belt 27 which can be wound out from a supply 25. The supply 25 is thereby wound up on a roller 24. Preparatory and finishing procedures can be carried out in the same manner as described with reference to FIG. 2. The unwound end of the conveyor belt 27, on the other side of the unwinding roller 26, can thereby be delivered to disposal means. This exemplary embodiment is particularly suited when the unwindable belt 27 is subject in the region of the table 3 to considerable wear and must be very frequently exchanged, for example when very small cutting patterns must be cut and the cutting tool penetrates in a cutting manner into the cutting support 13.

FIG. 8 further shows a perspective illustration from which it can be seen that the cutting head 5 is retained, controllably displaceably along a coordinate y, on a bridge 4 extending over the table 3, whilst the bridge 4 is for its part controllably displaceable in a coordinate direction x along the table 3. The cutting head 5 is in turn adjustable in height along the coordinate z, as described above.

FIG. 9 shows a further configuration, in which the conveyable belt is constituted as a belt 36 which can be moved to and fro. In a first mode of operation, a supply 37 wound up on a roller 38 is unwound from there and again wound up as a supply 29 on a roller 28, whereby in the region in which the belt 36 lies on the table 3, the cutting support 13 is defined. Expediently, the cutting procedure is effected with the aid of the cutting head 5 when the movement procedure of the belt 36 is halted; however, manners of operation are also conceivable in which the belt 36 is moved step-wise or continuously over the table 3. The decisive factor is that the lying material to be cut is reliably held in position during the cutting procedure and the cutting head 5 is correspondingly controlled in the x and y coordinate directions. Here also the preparatory or finishing procedures, as described with reference to FIG. 7, can be carried out (not shown in detail). This exemplary embodiment is suitable for example when the material to be cut is larger than the surface of the table 3 and/or when in the course of the cutting procedure the cutting support 13 is not so much affected that it must be disposed of, that is, when a repeated use is possible, but when the cutting support is not so little affected that it would be economically beneficial to use a circulating conveyor belt 39 as described with reference to FIG. 7.

What is claimed is:

1. A cutting device for cutting spread out material, said cutting device comprising;

a cutting table having a table surface which reflects electromagnetic radiation;

a cutting support carried on said table surface, said cutting support being configured to accommodate thereon, spread out material to be cut and to accommodate partial penetration by a cutting tool;

a cutting head mounted above said table surface in a manner such that it can be moved over the table surface;

at least one cutting tool mounted on the cutting head for engagement by lowering into material on said cutting support to cut the material according to a given pattern, whereby the cutting tool completely penetrates through the material and penetrates slightly into said cutting support;

a sensor mounted adjacent said cutting head to move therewith over said table, over said support and over material on said cutting support, said sensor having an electromagnetic radiation transmitter directed at said table surface and an electromagnetic radiation receiver for receiving electromagnetic energy reflected from said table surface, said sensor being arranged to detect, through the cutting support, the distance between the cutting head and the table surface during cutting of material on the cutting support; and a control arrangement arranged to respond to the detected distance between the cutting tool and the table surface as said head moves parallel to said surface during a cutting operation to regulate the position of the cutting head above the table surface thereby to control the penetration of the cutting tool into the material such that said cutting tool penetrates into the cutting support by a predetermined, constant amount, independently of the pressure applied to said cutting tool.

2. A cutting device according to claim 1, wherein:

a reflection layer of a material which reflects electromagnetic radiation is arranged on the table surface below the cutting support; and wherein said sensor is constructed and arranged to detect the distance on the basis of electromagnetic radiation reflected from the reflection layer.

3. A cutting device according to claim 1 or 2, wherein:

the cutting table includes a vacuum chamber; and wherein openings are provided which extend from said vacuum chamber to the surface of said table to attract material to be cut to the table by suction.

4. A cutting device according to claim 3, wherein:

the vacuum chamber is divided into a plurality of sub-chambers and wherein in dependence upon the position of the cutting tool, a vacuum is built up only in those sub-chambers above which the cutting tool is located.

5. A cutting device according to claim 4, wherein:

said cutting support is of a porous, air-permeable material.

6. A cutting device according to claim 2, wherein:

the reflection layer has openings which are connected with the openings which extend from the vacuum chamber to the table surface.

7. A cutting device according to claim 1, wherein said cutting head is provided with at least one of a cutting wheel, a draw knife and a stamping tool.

8. A cutting device according to claim 1, wherein said cutting tool is adjustable in respect of the penetration depth into the cutting support.

9. A cutting device according to claim 1, wherein:

the cutting support is of a tough plastics material, namely a material chosen from the group consisting of polyvinylchloride (PVC), polyvinylidenechloride, polyethylene and polypropylene.

10. A cutting device according to claim 1, wherein:

the cutting support is formed as a conveyable belt for delivery and removal of the material to be cut.

11. A cutting device according to claim 2, wherein:

the cutting support lies upon a sheet, the sensor is attached to the cutting head and the sensor detects, through the material to be cut, the distance from a side of the sheet facing said cutting head to the cutting support.

12. A cutting device according to claim 2, wherein:

the cutting support lies on one of a grid having an upper side and a perforated plate; and wherein the sensor is configured to detect the spacing from the upper side of the grid or perforated plate substantially without interruption.

13. A cutting device according to claim 12, wherein:

the table is formed by means of a closed, hollow-interior box having a cover with an upper side wall provided with grooves which are connected via through openings with an interior hollow chamber of the box, and wherein:

the grid or perforated plate lies on said upper side of said wall said interior hollow chamber being connected with means for generating a partial vacuum.

14. A cutting device according to claim 1, and further including:

an adjustment motor with a control device connected to receive output signals from the sensor.

15. A cutting device according to claim 10, wherein:

said conveyable belt is configured as a circulating conveyor belt.

16. A cutting device according to claim 10, wherein:

the conveyable belt is formed as a belt which can be unwound from a supply.

17. A cutting device according to claim 10, wherein:

the conveyable belt is moveable to and fro between two winding rollers onto and from which said belt can be wound.

* * * * *